Nov. 20, 1962
A. MARZOCCHI
3,065,103
METHOD FOR CLEANING AND COATING FIBROUS GLASS
Filed Dec. 30, 1957
5 Sheets—Sheet 1
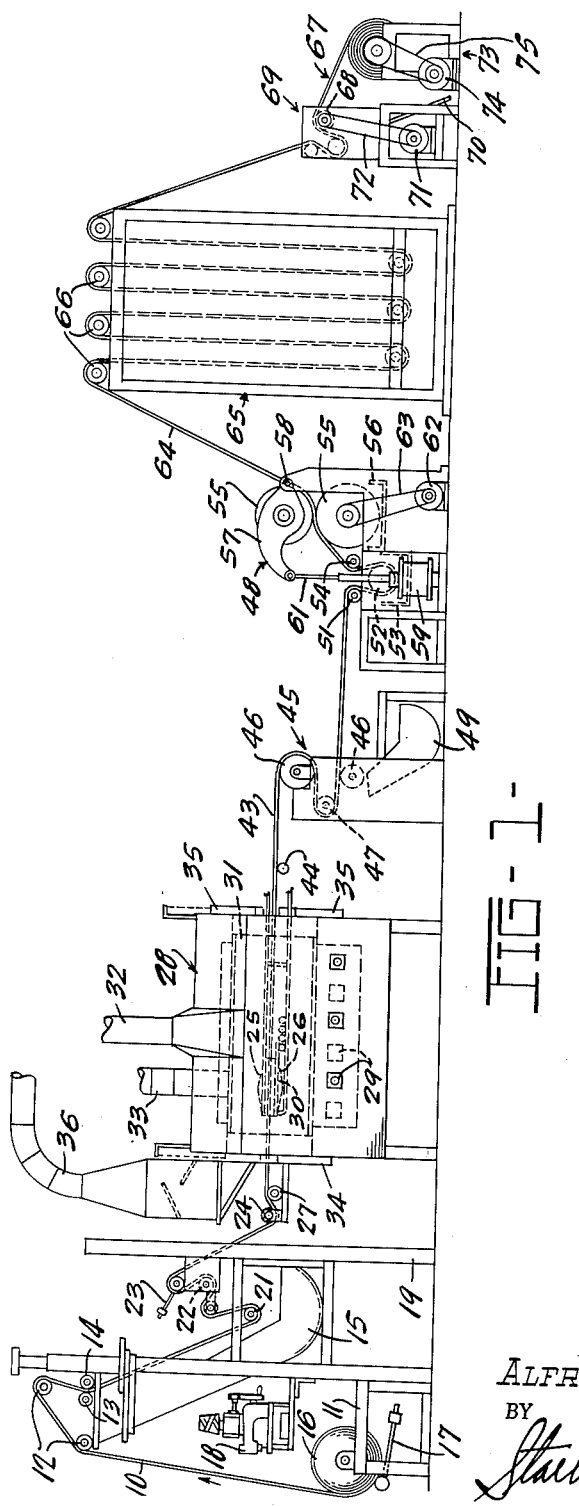
FIG-1-
INVENTOR:
ALFRED MARZOCCHI.
BY
ATT'YS.

Nov. 20, 1962  A. MARZOCCHI  3,065,103
METHOD FOR CLEANING AND COATING FIBROUS GLASS
Filed Dec. 30, 1957  5 Sheets-Sheet 2
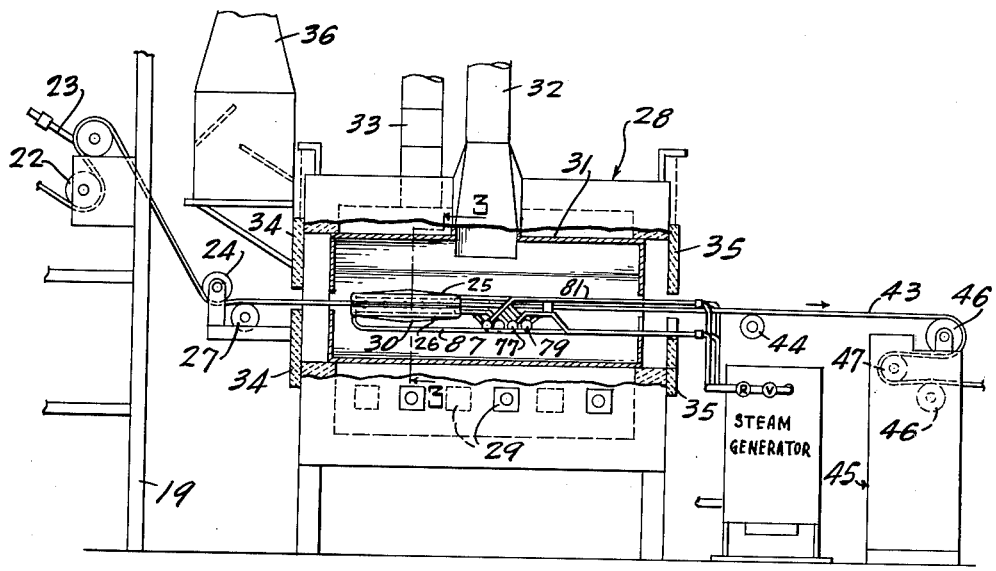
FIG-2-
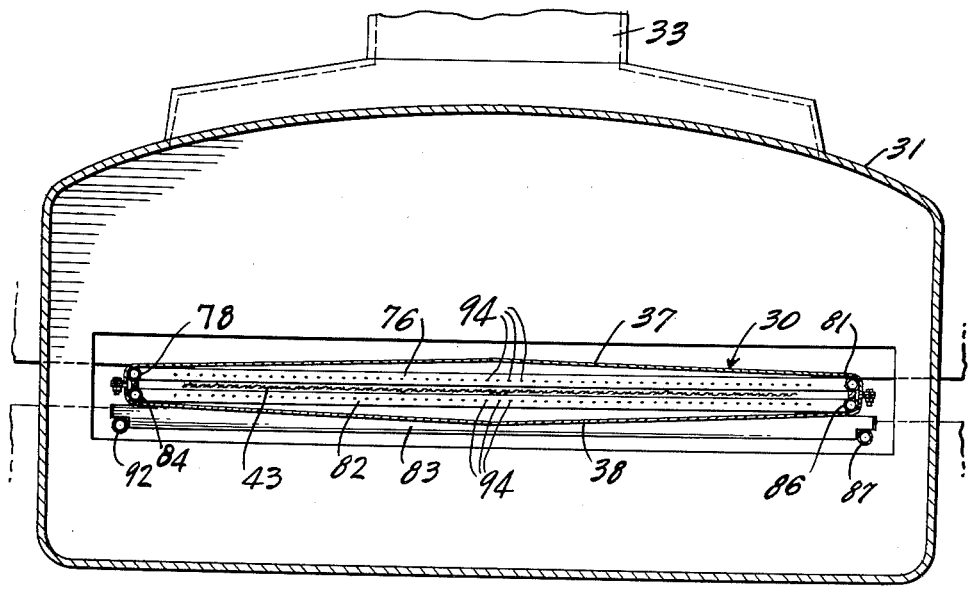
FIG-3-
INVENTOR:
ALFRED MARZOCCHI.
BY
ATT'YS.

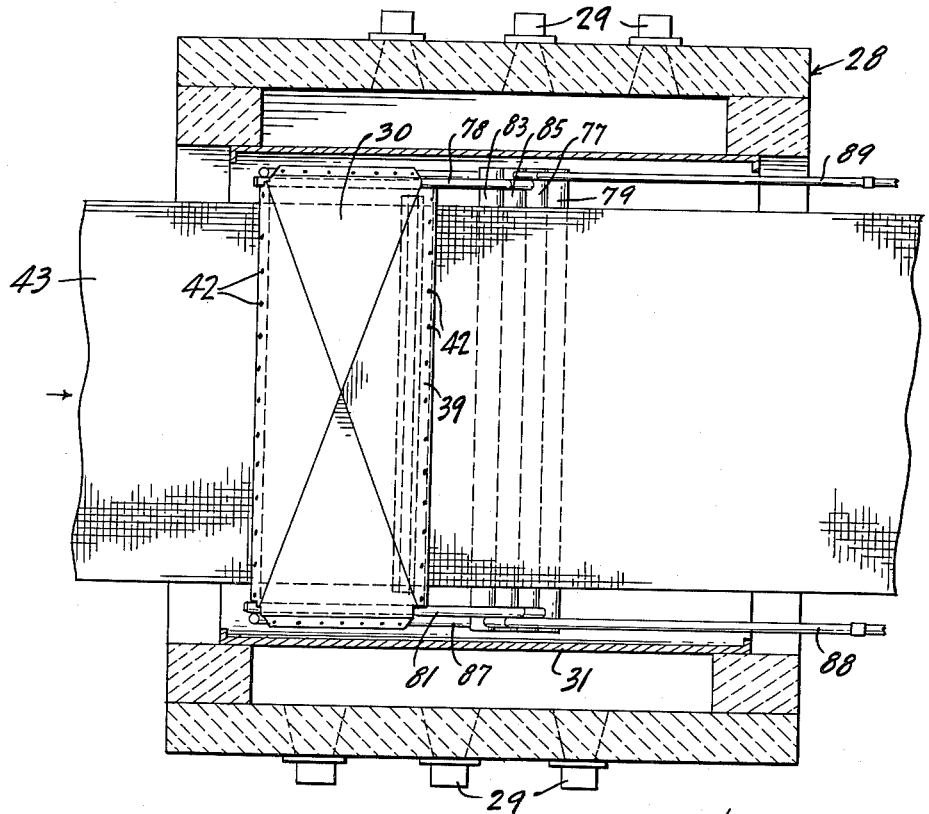
FIG-4-
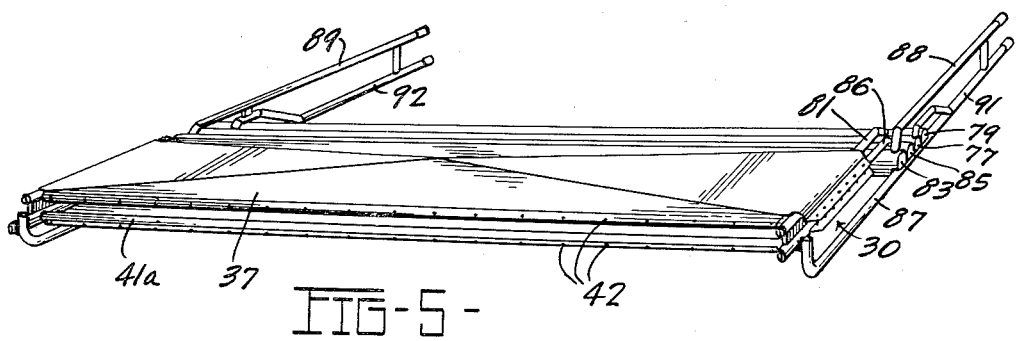
FIG-5-
INVENTOR:
ALFRED MARZOCCHI.
BY
ATT'YS.

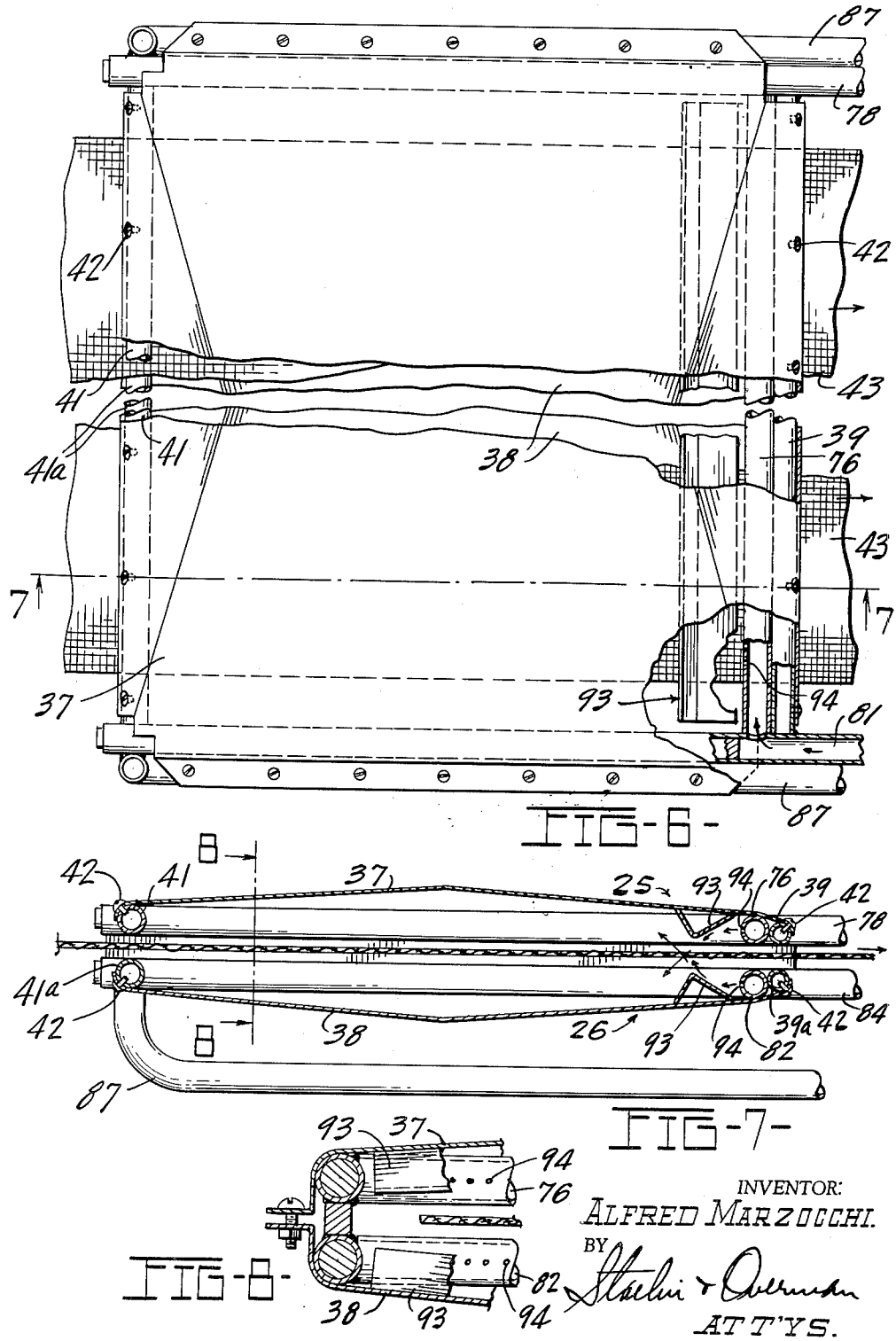

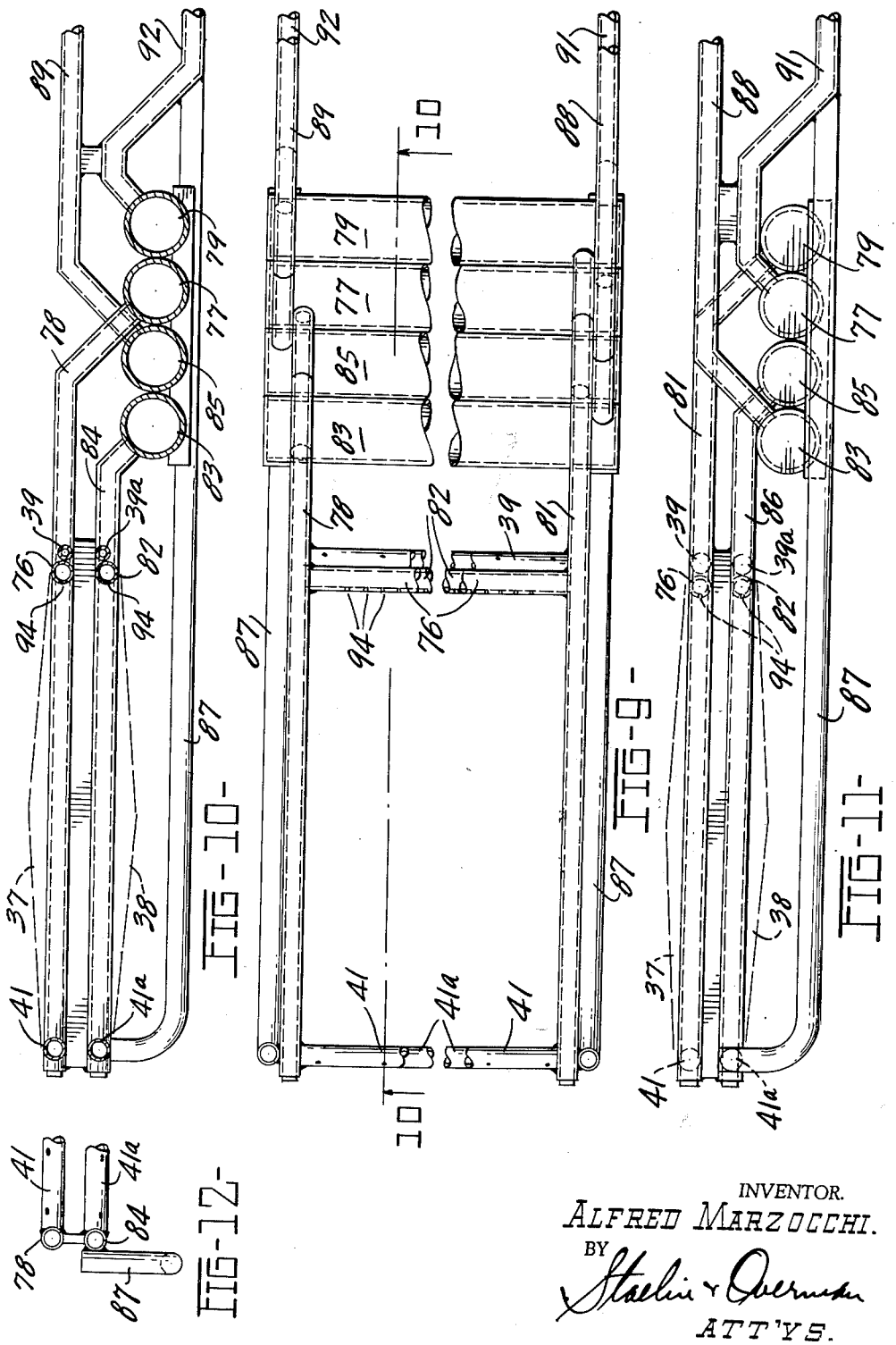

United States Patent Office 3,065,103
Patented Nov. 20, 1962

3,065,103
METHOD FOR CLEANING AND COATING FIBROUS GLASS
Alfred Marzocchi, Manville, R.I., assignor to Owens-Corning Fiberglas Corporation, a corporation of Delaware
Filed Dec. 30, 1957, Ser. No. 705,907
5 Claims. (Cl. 117—54)

This invention relates to treatment of fibrous glass and particularly to the treatment of fabrics of fibrous glass to improve the properties.

In treating fabrics woven of fibrous glass, it is advantageous to clean the fabric prior to application of treatments such as finishes and the like. For instance, when dyeing or printing, heat cleaning of the fibers of the fabric is carried out since the fresh clean glass surfaces formed by heat cleaning are quite reactive and very receptive to chemical combination with treating substances. Yarns from which the fabric are woven become weave set during the heat cleaning step.

Removal of forming size and/or lubricant applied to the fibrous glass to facilitate forming and weaving is accomplished to present clean glass surfaces to which the fabric finish can readily adhere. The most complete cleaning in the past has resulted from burning or oxidizing the materials from the glass surface. To control burning is very difficult under the best conditions and at times burning is unsatisfactory since carbon deposits and the like are sometimes formed which deposits cannot be removed by further burning. These problems are more severe when thick, heavy fabrics and staple fabric are being treated.

It is an object of this invention to provide a new method for improving physical properties of fibrous glass.

It is a further object to provide a method and apparatus for heat cleaning, weave setting and otherwise improving the physical properties of fibrous glass fabrics.

Further objects will be apparent from the description which follows.

In the drawings:
FIGURE 1 is a side elevational view of apparatus for carrying out the invention;
FIGURE 2 is a view in elevation of the oven, parts of the oven being broken away to expose the inner muffle assembly;
FIGURE 3 is a cross-sectional view on line 3—3 of FIGURE 2;
FIGURE 4 is a sectional, plan view of the oven;
FIGURE 5 is a perspective view of the inner muffle assembly;
FIGURE 6 is an enlarged plan view of the inner muffle assembly;
FIGURE 7 is a cross-sectional view on line 7—7 of FIGURE 6;
FIGURE 8 is a cross-sectional view on line 8—8 of FIGURE 7;
FIGURE 9 is a plan view of the pipe assembly of the inner muffle;
FIGURE 10 is a cross-sectional view on line 10—10 of FIGURE 9;
FIGURE 11 is a side elevational view of the pipe assembly of the inner muffle assembly; and
FIGURE 12 is a partial, end-elevational view of the pipe apparatus shown in FIGURE 10.

The apparatus comprises a let-off stand 11, idler rolls 12, 12, a pair of pull rolls 13, 14, the former being driven and the latter being an idler. Idler roll 14 is adapted for movement through the horizontal plane into and out of contact with driven pull roll 13. The pull rolls are actuated when scray pan 15 is to be filled. Scray pan 15 is filled during lacing operations and when a splice is to be made between ends of fabric as when a new roll 16 is being placed on let-off stand 11. Roll 16 when supported in let-off stand 11 has a leather strap brake 17 which provides a constant resistance to unrolling of the fabric 10. A sewing machine 18 provided with a transverse railway carriage is bolted onto frame 19 for securing the ends of rolls of fabric together.

Guide roll 21 is disposed above scray pan 15 as are the three tensioning rolls 22, 22. The uppermost tensioning roll is provided with a leather strap braking member 23. After the fabric passes over expander roll 24 where the longitudinal wrinkles in the cloth are removed and over guide roll 27, it passes into oven 28. The oven is provided with a plurality of gas burners 29, 29 which heat the oven to the desired operating temperature. The combustion products from the burners surround an outer, stainless steel muffle 31 in oven 28 and are then vented through exhaust stack 32.

Outer muffle 31 through which the fabric passes is provided with an inner muffle 30. Inner muffle 30 comprises an upper portion 25 and a like lower portion 26, the parts of the inner muffle being disposed one above the other and extending transversely across the width of the oven and spaced apart so that the fabric passes between the upper and lower portions. However, muffle 31 is vented through exhaust stack 33 which is positioned above inner muffle 30 and extends at its lower end across the width of muffle 31. At the entrance and exit ends of oven 28 are adjustable doors 34, 34 and 35, 35. Above the entrance to the oven is exhaust duct 36 adapted for removing gases given off by the fabric as the fabric passes into and through the oven.

Heat cleaned fabric 43 passes over guide roll 44 as it leaves oven 28. Draw roll unit 45 comprises two motor driven rolls 46, 46 positioned one above the other and idler roll 47. The draw roll unit pulls the fabric through the weave set oven 28 with the proper tension and also feeds the fabric into padder 48. Draw roll unit 45 is provided with a scray pan 49 which is used when the fabric is to be heat cleaned only. When heat cleaning only, the fabric is directed to a roll-up unit immediately after passing through the draw roll unit 45 and the scray pan is used when changing rolls at the roll-up unit. Driven rolls 46, 46 may be rubber covered or may be stainless steel rolls which are water cooled to resist the oxidation which normally takes place because of the elevated temperatures to which the draw roll unit is subjected.

Padder 48 comprises a guide roll 51, an immersion roll 52 disposed within dip pan 53, expander roll 54 and a pair of padder rolls 55, 55. The padder rolls are larger diameter, rubber covered rolls, the rubber having a Shore "A" Durometer hardness of about 65. The lowermost padder roll is partially submerged in the liquor contained in tank 56. The uppermost padder roll is journalled in lever arms 57 which are pivoted at point 58 and connected to air cylinders 59 through linkage 61. The lower padder roll is driven by an electric motor 62 and drive chain 63 and the upper padder roll is free to turn on its own axis.

The finishing agent which may or may not include a dye is applied by padder 48 and then set on the fabric by passing the treated fabric 64 through drying oven 65. Oven 65 is provided with a plurality of chain-driven rolls 66, 66 over which the fabric passes in the required number of passes as it is dried. After the fabric leaves the oven, it is directed to roll-up unit 67. Roll 68 of the take-up section 69 is driven by electric motor 71 through drive belt 72. The spindle of the roll-up stand 73 is driven by motor 74 through drive belt 75. Scray pan 70 is disposed between take-up section 69 and roll-up unit 67. Take-up section 69 runs at a constant speed and feeds the fabric to roll-up stand 73. During the time required to remove full rolls of the finished product, the fabric is deposited in scray pan 70. The speed of the roll-up stand 73 varies as the roll size increases since this section is driven by a constant-torque motor.

Although only one padder and one oven are shown, for many applications another padder and oven is inserted into the production line between drying oven 65 and roll-up unit 67 shown in FIGURE 1. Any number of padders or padders and ovens may be inserted as is necessary. Two, three or more successive padding and drying steps are sometimes used.

The production equipment as described has a central, direct current controlled drive system for regulating the speed of the fabric from draw roll unit 45 to roll-up unit 67. Rheostats are located at draw roll unit 45, oven 65, padder 48 and roll-up unit 67 to control the speed of the fabric so that the tension can be finely adjusted at each unit.

FIGURES 2 and 4 are enlarged views which disclose details of the oven with clarity. The oven comprises an outer muffle 31 and an inner muffle 30, the inner muffle comprising an upper hood 37 and an inverted lower hood 38. Upper portion 25 of the inner muffle 30 comprises upper hood 37 which is secured to transverse pipes 39, 41 by screws 42, 42. The lower portion 26 of inner muffle 30 comprises inverted lower hood 38 secured to transverse pipes 39a and 41a by screws 42, 42.

The upper portion 25 of the inner muffle has perforated pipe 76 extending across its width. This perforated pipe 76 is connected to preheat pipe 77 by pipe 78 and to preheat pipe 79 by pipe 81. Lower portion 26 of the inner muffle has a perforated pipe 82 which is connected to preheat pipe 83 by pipe 84 and to preheat pipe 85 by pipe 86. Inner muffle 30 rests upon support pipes 87, 87 within the oven and can be moved toward or away from the entrance end of the oven.

Steam is introduced into preheat pipe 83 through inlet pipe 88, to preheat pipe 85 through inlet pipe 89, to preheat pipe 77 through inlet pipe 91, and to preheat pipe 79 through inlet pipe 92. Each of the perforated pipes 76 and 82 has a baffle member 93 positioned adjacent to the horizontal line of holes in the pipes. Steam emitting from holes 94, 94 passes in small jets horizontally until the jets hit the angled portion of the baffle member and then they are deflected so that they pass toward the cloth. The steam passes through the cloth and then along with inspirated gases within the inner muffle toward the entrance end of the inner muffle.

The entire inner muffle assembly is movable with respect to the outer muffle. It is advantageous to move the inner muffle with respect to the outer muffle when operating under certain conditions. If the rate of travel of the fabric being treated is to be increased, it is generally necessary to move the inner muffle assembly toward the exit end of the oven to insure that no burning takes place within the oven during the heat cleaning and weave setting. When lightweight fabrics are being treated, and also when the speeds with which the fabric is being advanced is decreased, it is desirable to move the inner muffle toward the entrance end of the oven to prevent burning. It is not to be inferred that slow speeds are used with lightweight fabrics; rather, it has been found that lightweight fabrics such as marquisettes can be run at the greatest speed with very satisfactory results. Casement cloth and staple fabrics can likewise be cleaned and weave set at much greater speeds than formerly was possible using equipment that actually burned the size materials from the fabric. Processing rates are increased as much as two times or more over conventional speeds formerly used with heat cleaning equipment utilizing burning.

When operating this apparatus, fabric is introduced into the entrance end of the oven through doors 34, 34. The volatile materials leave the oven through stack 33 and also are emitted from the entrance end of the oven and pass through exhaust duct 36. The flow of gases through the oven is from the exit end of the oven to the entrance end of the oven in a counterflow with respect to the direction of travel of the fabric. This is caused by a differential pressure, the pressure being greater at the exit end of the oven and lesser at the entrance end of the oven. The cold fabric entering the entrance end of the oven reduces the temperature and pressure at the entrance end while the build-up of heat takes place in the fabric as it passes from the entrance to the exit end and therefore the temperature and pressure at the exit end of the oven are higher than the entrance end. The steam released within the inner muffle is dispersed completely by the baffle members and then passed into the fabric. The steam which is released within the inner muffle is superheated in the preheat pipes prior to its release. The steam provides an atmosphere within the inner muffle which prevents oxidation and at the same time the steam forms low molecular weight products that distill off the surface of the fabric and these products then thermally decompose and pass out the inner muffle and out of the oven. Hydrolyzation at the surface of the glass takes place with the result that active groups are present upon the glass after it is cleaned. The fact that the gases pass through the oven from the exit end to the entrance end while the fabric passes in the opposite direction results in a very efficient cleaning process that can be easily controlled.

Another method of releasing steam within the oven is as follows. Water is introduced onto the fabric and the wetted fabric is heated within the oven to a temperature at which steam is formed. The organic matter and the steam pass into the atmosphere in the oven and then pass out of the oven due to an increase in pressure within the oven caused by the release of steam and by expansion of the gases in the oven atmosphere.

In starting the apparatus shown in the drawings, a leader cloth constructed of fibrous glass and heavy glass cords are used. A wooden shell or tube of leader cloth is placed on let-off stand 11 and brake 17 is released. The leader cloth is laced through the apparatus substantially following the path shown in FIGURE 1. Metal hooks or the like are used to pull the leader cloth through weave set oven 28. After the leader cloth is laced through draw roll unit 45, heavy glass cords which have been laced through the padder rolls 55, 55, drying oven 65, and roll-up unit 67 are secured to the leader cloth.

Once sufficient leader cloth has been taken through the charge end of the line, a roll of fabric to be treated is placed on the let-off stand and the cloth end is attached to the end of the leader cloth by using sewing machine 18. A single stitch seam using glass sewing thread is made.

After the lacing has been completed, weave set oven 28 and drying oven 65 are brought up to operating temperature by lighting the gas burners in each. The temperature of the weave set oven 28 may be from about 1100° to about 2000° F. or higher. Drying oven 65 is maintained at a temperature of from about 200° to 400° F. and preferably from about 275° to 375° F. A finish or other after-treatment solution is prepared and introduced into dip pan 53 and adjoining tank 56.

A suitable finish comprises the following ingredients in weight percent:

| Ingredient: | Percentage by weight |
|---|---|
| Polyvinyl alcohol (Elvanol 71–24) | 1.5 |
| Quaternary amine compound (Sapamine WL) [1] | 8.0 |
| Stearato chromic chloride (Quilon) [2] | 2.0 |
| Water | 88.5 |

[1] Quaternary amine compound in which one of the amine groups of ethylene diamine is reacted with a fatty acid to form a fatty amide while the other is made tertiary by reaction with an alkyl compound.
[2] A compound having an acido group with more than 10 and preferably from 14–18 carbon atoms.

As the process continues more finish is added to dip pan 53 as required to replace that being applied to the fabric. Pigments and dye stuffs are added to the finish used as may be desired.

The central drive is energized and the process is then commenced. The fabric to be treated is advanced to weave set oven 28 by the action of draw roll unit 45. As the fabric comes up to the temperature of the oven, the components of the size composition upon the fabric volatilize off and the products of volatilization pass upwardly through stack 33 and out the entrance end of the oven and through stack 36. The fabric is entirely heat cleaned and weave set as it passes through the oven. Steam from the steam generator is directed through the inlet pipes to the preheaters and after the steam is further heated, it is released in the inner muffle. A true white fabric is produced and this fabric 43 can then be dyed true color shades or if it is to remain undyed, a true white product is provided. This is a distinct advantage in that some former cleaning processes have provided off-white shades which were not always reproducible and for that reason undesirable.

Air cylinders 59 are set so that the pressure on the padder rolls 55, 55 is proper. In the padder unit the fabric is drawn through dip pan 53 and then through padder rolls 55, 55 which distribute a finishing agent throughout the fabric and remove the excess finish. Excess finish is collected in tank 56 and is returned to dip pin 53 through a connecting tube. Tension of the fabric between the draw roll unit 45 and padder 48 is controlled by adjusting the speed of the padder rolls 55, 55 with a rheostat which is a part of the D.C. central drive system. As the fabric travels through drying oven 65, moisture is removed from the finish of the fabric and the finish becomes set upon the fabric.

When the need for a new roll of fabric arises, roll 14 is moved into contact with roll 13 and they are then speeded up to accumulate enough fabric in the scray pan 15 to allow time for the splicing operation. When the splice has been made, roll 14 is again moved to the open position and driven roll 13 is stopped. When treating fabric such as marquisette, pull rolls 13 and 14 are maintained in a closed or in-contact position except when the splice is being made. A supply of fabric is maintained in the scray pan 15 at all times, the amount being controlled by adjusting the speed of pull rolls 13, 14. Heavy fabric such as casement fabrics and staple fabrics are not folded in the scray pan 15 except when it is necessary to make a splice.

Generally the fabric is passed through the weave-set oven and then through the first padder where an emulsion of the ingredients of the finish is applied. The fabric is then dried at a temperature of from 275° to 300° F. and a further treatment, such as a dispersion of stearato chromic chloride, may be applied at the second padder and the fabric again dried.

Steam suitable for introduction into the preheaters may be at about 28 pounds gage (200° to 300° F.). The steam when introduced into the inner muffle will be at a temperature of from about 1000° to 1100° F.

The properties of the treated fabrics are unexpectedly improved over fabrics treated by the old flame method. Burning the materials from the fabric, it would seem, would provide complete heat cleaning; however, it has been found that volatilization of the materials with attendant hydrolyzation of the surfaces of the glass fibers provides greatly improved properties. The fabric is very clean and at the same time the surfaces of the glass fibers are in a very reactive state so that finishes applied after heat cleaning will attach securely to the glass fibers. An improved finished fabric is provided. The steam introduced into the heat cleaning oven is also believed to help carry away the vaporized materials which come off of the fabric being cleaned. The steam purges the vaporized materials from the system with the result that complete cleaning is possible without fear of recondensation. Steam also hydrolyzes the organic materials to promote the removal of such material from the glass surfaces. Very uniform results are obtained with a complete lack of yellowing or partial carbonization which at times occurs when flame treatments are used.

Instead of introducing steam into the preheaters, water may be introduced into the preheaters so that steam is produced within the preheaters and this steam then directed into the inner muffle.

Various modifications may be made within the spirit and scope of the appended claims.

I claim:
1. Method of treating glass fabric comprising advancing a fabric having organic material on its surfaces into a treating zone, elevating the temperature of the fabric within said treating zone above the temperature at which the organic materials on its surfaces volatilize, and introducing steam onto the fabric within said treating zone to prevent oxidation of the organic materials, to form distillable products of the organic materials, to purge the distillable products from the glass fabric and from said treating zone, and to hydrolyze the glass fabric surfaces and thereby activate the glass surfaces for attachment of further treatments.

2. The process of claim 1 wherein the hydrolyzed surfaces of the glass fabric are treated with an aqueous finish.

3. Method of continuously heat cleaning and weave setting a glass yarn fabric comprising advancing a glass fabric having combustible volatile materials on the surfaces of the fibers into a treating zone, heating the fabric while in said treating zone to an elevated temperature at which the combustible materials volatilize from the surfaces of the fibers, directing jets of steam into the fabric while in the treating zone to purge all volatilized combustible materials from the fabric, to provide a non-oxidizing atmosphere within the treating zone, and to hydrolyze the glass fiber surfaces, and then removing the advancing fabric from the treating zone.

4. The process of claim 3 wherein the highly reactive hydrolyzed surfaces of the glass fibers are treated with a finish and the fabric is heated to cause the finish to attach securely to the glass surfaces.

5. Method of applying a finish to a fibrous glass fabric having a combustible size thereon comprising a cleaning step and a finishing step, said cleaning step comprising advancing said fabric into a treating zone, heating the fabric while in said treating zone to from about 1100° to 2000° F. which is normally sufficient to burn the combustible size from the fabric, and introducing steam into the treating zone to prevent oxidation of the size, to form distillable products of the size, to purge the fabric and the treating zone of said distillable products, and to hydrolyze the glass surfaces thereby making these surfaces more receptive to the finish.

References Cited in the file of this patent
UNITED STATES PATENTS

| | | |
|---|---|---|
| 392,082 | Turner | Oct. 30, 1888 |
| 1,902,815 | Goodhue | Mar. 28, 1933 |
| 2,008,230 | Spooner | July 16, 1935 |
| 2,210,290 | Heinsohn | Aug. 6, 1940 |
| 2,288,980 | Turin | July 7, 1942 |
| 2,450,047 | Kloeckener | Sept. 28, 1948 |
| 2,494,731 | Vincent et al. | Jan. 17, 1950 |
| 2,635,390 | Parker | Apr. 21, 1953 |
| 2,643,487 | Parker | June 30, 1953 |
| 2,788,540 | Snape | Apr. 16, 1957 |
| 2,845,364 | Waggoner | July 29, 1958 |
| 2,868,669 | Marzocchi | Jan. 13, 1959 |
| 2,877,636 | Dungler | Mar. 17, 1959 |
| 3,008,846 | Caroselli | Nov. 14, 1961 |